INVENTOR.
ARVID E. ENGLUND
BY David Blumenfeld
ATTORNEY

United States Patent Office 3,256,474
Patented June 14, 1966

3,256,474
BATTERY CHARGING AND
PROTECTIVE CIRCUIT
Arvid E. Englund, Jr., Lynchburg, Va., assignor to General Electric Company, a corporation of New York
Filed July 22, 1963, Ser. No. 296,849
2 Claims. (Cl. 320—7)

This invention relates to battery charges and more particularly to a battery charging and protective circuit for a series-parallel battery arrangement.

Many present day electrical circuits are designed for operation as dual voltage systems and thus require a dual voltage input. A common arrangement for furnishing a dual voltage input utilizes a series-parallel circuit arrangement of batteries which furnishes a six-volt output (parallel operation) or a twelve-volt output (series operation). Consequently, it has become desirable to provide a battery charger which will selectively charge either a six-volt battery source or a twelve-volt battery source, the apparatus being conditioned through a switching operation carried out by operator for maintaining the batteries in a charged condition.

When utilizing a battery charger in such a dual voltage system it is desirable that the batteries be charged evenly, without one battery taking all the charge current because of differences that may exist in the internal resistance of the batteries and that the batteries be charged equally in both the series and parallel arrangements. In addition, when the batteries are connected in parallel, a difference in internal resistance of the individual batteries tends to result in one battery being overcharged, and when the battery charger is deenergized the overcharged battery will have a tendency to try to reverse charge the undercharged battery. This reverse charging, if allowed to occur, substantially reduces the life of the latter battery and often results in cell failure.

In the present invention a battery charger is provided for equally charging a battery power source in a series or parallel circuit arrangement of batteries, and a protective circuit is incorporated therein which prevents uneven charging and reverse charging of the batteries.

Accordingly, it is an object of this invention to provide an improved battery charging and protective circuit for evenly charging a series-parallel battery circuit arrangement.

Another object of this invention is to provide an improved battery charging and protective circuit which prevents reverse charging of a series-parallel battery circuit arrangement.

A further object of this invention is to provide an improved constant current battery charging and protective circuit for equally charging a series or parallel battery circuit arrangement.

A further object of the invention is to provide an improved battery charging and protective cricuit which is simple and inexpensive.

In carrying out the invention, in one form thereof, there is provided a dual voltage battery power source comprising a plurality of batteries in a series-parallel circuit arrangement. A like pole or terminal of each battery is connected to a constant current charge source for charging the batteries, and each pole is further connected to a corresponding rectifier which is poled for conduction in a direction to prevent reverse charging of the batteries in the parallel or six-volt position when the battery charger is deenergized. A suitable switching means, including a switch, is provided to condition the circuit for six-volt or twelve-volt operation, and an asymmetric conducting device is provided in the circuit across the other like poles of the batteries to provide equal charging of the series-parallel battery arrangement in both the six and twelve-volt positions.

While the specification concludes with claims particularly pointing out and distinctly claiming the subject matter regarding the invention, it is believed the invention will be better comprehended from the following description taken in connection with the accompanying drawings.

Figure 1:
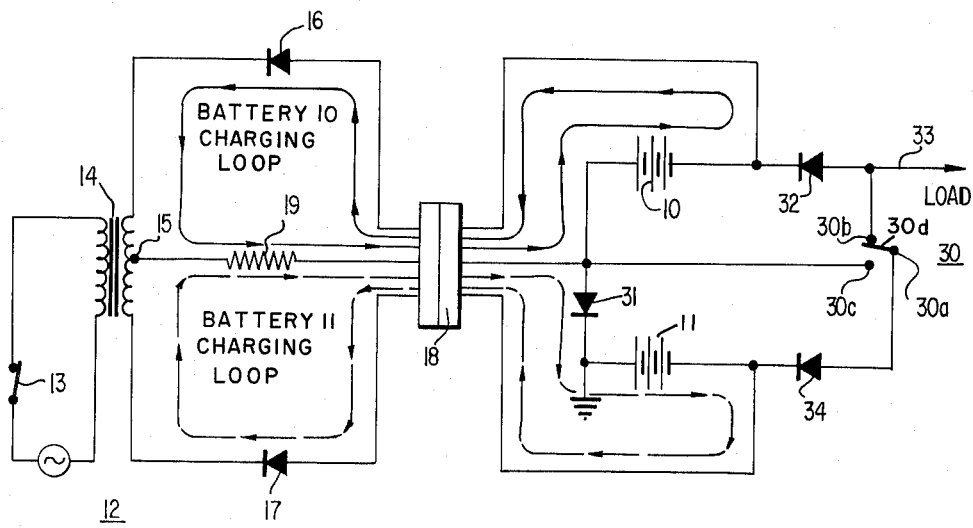
FIG. 1 is a schematic representation of the battery charging and protective circuit embodied in this invention and arranged for parallel operation.

Referring to FIG. 1, there is illustrated a pair of batteries 10, 11, each battery comprising a plurality of cells which may be, for example, three two-volt cells to thereby provide two six-volt batteries. While FIG. 1 illustrates two six-volt batteries arranged to be connected in a series or parallel arrangement for providing a twelve-volt or a six-volt source, respectively, it should be readily apparent that any number of cells may be utilized to provide any desirable output, it only being necessary that the batteries be connected through a suitable switching arrangement for series or parallel operation.

For charging the batteries there is provided a battery charger 12 which is connected through a control switch 13 to a suitable source of alternating current. Battery charger 12, which may be of conventional design, serves to rectify the alternating current and provides the series-parallel battery arrangement with charging current of suitable magnitude. Battery charger 12 comprises a transformer 14 having a primary winding and a secondary winding center tapped at 15. Opposite ends of the transformer secondary winding serve to provide points of oppositely phased alternating voltage while the center tap provides an intermediate point of fixed reference potential. For converting the alternating current to direct current, rectifiers 16 and 17 are provided, the rectifiers having their cathodes connected, respectively, to the opposite points or ends of the secondary winding of transformer 14. The anodes of rectifiers 16 and 17 are connected, respectively, to the negative pole of batteries 10 and 11 through a suitable connecting plug 18. Center tap 15 completes the battery charging circuit and is connected through an impedance 19 and connecting plug 18 directly to the positive pole of battery 10 and to the positive pole of battery 11 through asymmetric conducting device 31 which may for example, be a diode.

Impedance element 19, which may for example be a resistor, is chosen to have a high value of impedance in comparison to the internal impedance or resistance of the batteries 10 and 11 to provide a constant charge current of a predetermined value. The high value of impedance of element 19 establishes the desired predetermined magnitude of charge current flow through the batteries 10 and 11, and since the impedance element 19 has a relatively constant value variation in the internal resistance of either battery, which may occur upon use, does not affect the rate of charge.

Connecting plug 18 provides a convenient arrangement for maintaining the battery charger 12 and the series-parallel battery arrangement separate; however, it should be readily apparent that, if desired, the connections to the series-parallel battery arrangement may be made directly.

For selectively connecting or conditioning said batteries for series or parallel operation, there is provided a switching circuit comprising switch 30 and the asymmetric conducting device 31. Switch 30 may be a double-pole, single-throw switch having a movable contact arm 30d which selectively serves to establish electrical connection between contacts 30a and 30b for six-volt operation and electrical connection between contacts 30a and 30c for twelve-volt operation.

Figure 2:
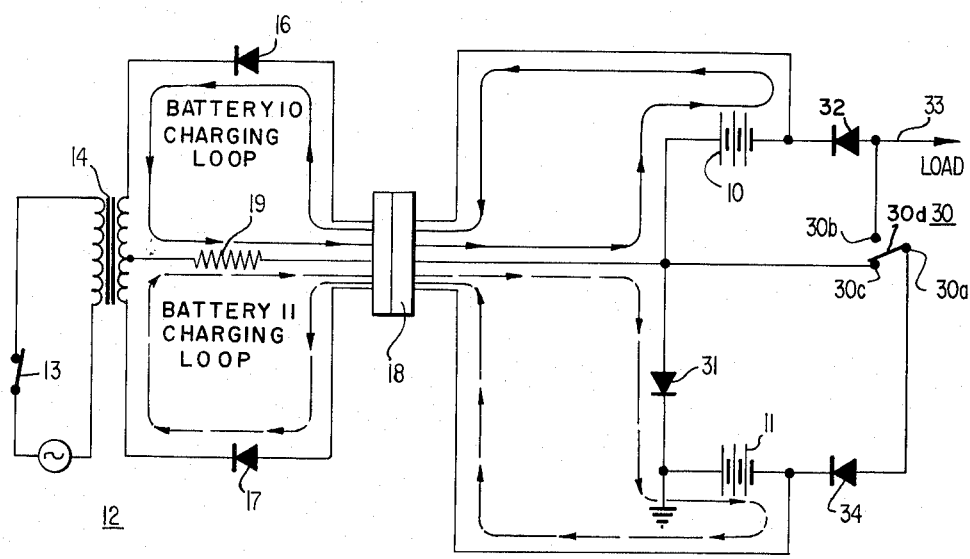
FIG. 2 is a schematic representation of the battery charging and protective circuit embodied in this invention and arranged for series operation.

Switch 30 has two positions, an upper position and a lower position. In the upper position, batteries 10 and 11 are connected in parallel, as shown in FIG. 1, through contacts 30a and 30b, and in the lower position, batteries 10 and 11 are connected in series, as shown in FIG. 2, through contacts 30a and 30c. Diode 31 provides equal charging of the batteries in both the series and parallel arrangement on alternate half cycles of the charging source, and is arranged, when in the parallel connection and conducting, to place the positive pole of battery 10 at the intermediate points of fixed reference potential. The positive pole of battery 11 may be permanently maintained at ground potential if desired.

In the upper or six-volt position, battery 10 is selectively connected across the upper half of the secondary winding of transformer 14, the circuit extending from the negative pole of battery 10 through connecting plug 18, rectifier 16, the upper half of the secondary winding of transformer 14, impedance 19 and connecting plug 18 to the positive pole of battery 10. A similar circuit is made for battery 11 through asymmetric conducting device 31, this circuit extending from the negative pole or terminal of battery 11, through connecting plug 18, rectifier 17, the lower half of the secondary winding of transformer 17, impedance 19, plug 18 and asymmetric conducting device 31 to the positive pole of battery 11 which is, in turn, grounded. Diode 31 also thereby establishes a discharge path for battery 11 through diode 32, the load, and back through diode 31.

The negative pole of battery 10 is connected through rectifier 32 to the load conductor 33. The corresponding pole of battery 11 is connected through rectifier 34 and switch arm 30d of switch 30 in its upper position to load conductor 33. Thus, both batteries are connected in parallel and charged evenly, through respective independent circuits, from the battery charger 12. For convenience the charge path for battery 10 is illustrated by the solid loop 35, and the charge path for battery 11 is illustrated by the dashed loop 36.

To prevent reverse charging of the batteries 10 and 11 when the battery charger 12 is deenergized, rectifiers 32 and 34 are provided and suitably poled. To this end, the cathode terminals of rectifiers 32 and 34 are connected, respectively, to the negative poles of batteries 10 and 11, while the anode terminals of rectifiers 32 and 34 are connected respectively to contacts 30b and 30a of switch 30. With switch arm 30d in its upper position, batteries 10 and 11 are connected in parallel. If either battery were charged to a higher potential than the other and diodes 32 and 34 were not in the circuit, the higher charged battery would tend to charge the lower charged battery. This reverse charging is blocked by diodes 32 and 34 which are poled to prevent the flow of circulating current in the battery loop when the battery charger 12 is deenergized.

FIG. 2 is a schematic representation of the battery charging and protective circuit embodied in this invention with switch 30 in its lower position to provide the series or twelve-volt operation. Since the elements of FIG. 2 are identical to those of FIG. 1, like numerals have been employed.

Referring to FIG. 2, switch arm 30d is shown in its lower position thus connecting batteries 10 and 11 in series through contacts 30a and 30c to provide a twelve-volt output at load conductor 33. Batteries 10 and 11 are selectively connected, respectively, to opposite points of oppositely phased alternating voltage appearing across the upper and lower halves of the secondary winding of transformer 14 for charging of the batteries through their respective independent circuits. The charge path for battery 10 is illustrated, in FIG. 2, by the solid loop 38 and the charge path for battery 11 is illustrated by the dashed loop 39.

The right hand terminal or negative pole of battery 10 is connected, as before, through rectifier 32 to the load conductor 33. The corresponding pole of battery 11 is connected through rectifier 34 and switch arm 30d of switch 30 to the positive pole or terminal of battery 10. Thus, a series circuit is established through battery 11, diode 34, battery 10, diode 32 to load conductor 33 to provide a twelve-volt source, while still permitting equal charging of the batteries.

In operation battery charger 12 is connected to a suitable source of alternating current and may be energized in any suitable manner, such as, for example, by switch 13 in the input line of the primary winding of transformer 14. The alternating current is rectified through rectifiers 16 and 17 to provide a D.C. charging current for batteries 10 and 11. Resistor 19 serves to provide a constant charge current, since the impedance value is high in comparison to the internal resistance of the batteries 10 and 11. Rectifiers 16 and 17, which are poled for conduction on the presence of negative pulses appearing at their cathode terminals, also serve to prevent the batteries from discharging through the charging loop which includes resistance 19 and transformer 14. When the batteries have been fully charged, the battery charger may be disconnected from the circuit and a suitable disconnect plug 18 is provided to permit convenient physical removal or disconnection of the battery charger as desired.

When the batteries 10 and 11 are connected in the parallel circuit arrangement, one of the batteries may receive a higher charge than the other. Rectifiers 32 and 34 are poled for conduction in a direction to prevent reverse charging of the higher charged battery through the other battery when the battery charger is disconnected from the circuit.

Selective operation of the battery charging for six or twelve-volt operation is effected by the placement of switch 30. With switch 30 placed in the six-volt position, the circuit comprising battery 10 and rectifier 32 is connected in parallel with the circuit comprising battery 11 and rectifier 34 across the load to provide a six-volt source. With switch 30 placed in the twelve-volt position, the circuit comprising battery 10 and rectifier 32 is serially connected with the circuit comprising battery 11 and rectifier 34 to provide a twelve-volt source. Diode 31 is poled for conduction in a direction to provide equal charging of the batteries in both the six and twelve-volt arrangement by establishing an intermittent charge path for battery 11 when the batteries are serially connected in the twelve-volt arrangement.

Although a particular embodiment of the subject invention has been described, many modifications may be made, and it is intended by the appended claims to cover all such modifications which fall within the true spirit and scope of the invention.

What is claimed as new and desired to be secured by Letters Patent of the United States is:

1. In a battery charging and protective circuit the combination comprising: a pair of storage batteries, a source of alternating voltage having an intermediate point of fixed reference potential and opposite points of oppositely phased alternating voltage, rectifying means connected to said opposite points for rectifying said alternating voltage to provide thereby a direct charging current for said batteries, means connecting said direct charging current to a like pole on each of said batteries, an asymmetric conducting device connected between the other like poles of said batteries, said asymmetric conducting device being poled in a direction to establish a charging path for one of said batteries during both serial and parallel operation, and a discharge path for the other of said batteries during parallel operation, a switch having two selective positions, said switch being arranged in one of its positions to connect said batteries in parallel arrangement between said intermediate point and a load conductor and arranged in its other position to connect said batteries in series aiding relation between said intermediate point and said load conductor, and a pair of rectifiers, each of said rectifiers being arranged in series with a corresponding battery and being poled for conduction in a direction to prevent reverse charging therethrough and to supply to said load conductor the unidirectional voltage of its corresponding battery.

2. A battery charging and protective circuit for a pair of batteries arranged to be charged from a common source of alternating current having an intermediate point of fixed reference potential and opposite points of oppositely phased alternating voltage comprising: battery charging means connected to the opposite points for converting the alternating current to a direct charging current, means for connecting said battery charging means to a like pole on each of the batteries for translating said direct charging current thereto, a rectifier serially connected with each of the batteries, said rectifiers being poled for conduction in a direction to prevent reverse charging of the batteries, and switching means including an asymmetric conducting device and a switch, said asymmetric conducting device having its anode terminal connected to the other pole on one of said batteries and the intermediate point of fixed reference potential and having its cathode connected to the other pole on the other of said batteries to thereby provide a charging path for said other batteries during serial operation and a discharging path for said one battery during parallel operation, thereby permitting substantially equal charging of the batteries during both serial and parallel operation, said switch being connected to said serially connected rectifiers for selectively connecting the batteries and their serially connected rectifiers for series or parallel operation.

References Cited by the Examiner

UNITED STATES PATENTS

| | | | |
|---|---|---|---|
| 1,067,631 | 7/1913 | Woodbridge | 320—7 |
| 3,021,469 | 2/1962 | Ganiere et al. | 320—16 X |

JOHN F. COUCH, *Primary Examiner.*

LLOYD McCOLLUM, *Examiner.*

S. WEINBERG, *Assistant Examiner.*